United States Patent
Kovacic et al.

(10) Patent No.: US 9,558,382 B2
(45) Date of Patent: Jan. 31, 2017

(54) METHOD FOR AN ACQUISITION OF DATA FROM EXTERNAL DIGITAL SENSORS WITH AN RFID SMART TAG AND A TAG INTEGRATED CIRCUIT FOR CARRYING OUT SAID METHOD

(75) Inventors: Kosta Kovacic, Maribor (SI); Vinko Kunc, Ljubjana (SI); Anton Pletersek, Orehova Vas (SI)

(73) Assignee: AMS R&D ANALOGNI POLPREVODNIKI, D.O.O., Ljubljana (SI)

( * ) Notice: Subject to any disclaimer, the term of this patent is extended or adjusted under 35 U.S.C. 154(b) by 438 days.

(21) Appl. No.: 14/236,066

(22) PCT Filed: Aug. 1, 2012

(86) PCT No.: PCT/SI2012/000050
§ 371 (c)(1),
(2), (4) Date: May 20, 2014

(87) PCT Pub. No.: WO2013/019164
PCT Pub. Date: Feb. 7, 2013

(65) Prior Publication Data
US 2014/0247118 A1    Sep. 4, 2014

(30) Foreign Application Priority Data

Aug. 3, 2011  (SI) .................................. 201100294

(51) Int. Cl.
*G06K 7/10* (2006.01)
*G06K 19/07* (2006.01)
(Continued)

(52) U.S. Cl.
CPC ....... *G06K 7/10009* (2013.01); *G06K 19/0717* (2013.01); *G06K 19/07749* (2013.01);
(Continued)

(58) Field of Classification Search
None
See application file for complete search history.

(56) References Cited

U.S. PATENT DOCUMENTS 7,844,505 B1 * 11/2010 Arneson ............. G06Q 10/087
340/10.2
8,026,795 B2 * 9/2011 Qi .......................... G01D 9/005
340/10.1

(Continued)

FOREIGN PATENT DOCUMENTS

| WO | 00/58752 A1 | 10/2000 |
| WO | 2008/065692 A2 | 6/2008 |
| WO | 2011/049533 A1 | 4/2011 |

*Primary Examiner* — Mohamed Barakat
(74) *Attorney, Agent, or Firm* — McDermott Will & Emery LLP

(57) ABSTRACT

A microprogram for performing communication between an RFID smart tag and external digital sensors (EDS1, EDSK) is loaded in a buffer (Bu). A hard-wired dedicated processing unit (DPU) of the tag reads, decodes and executes said microprogram through the digital communication interface (DCI). The sensor data is stored at beginning locations of said buffer (Bu), wherefrom they are read by an RFID interrogator. The tag functionality in an application is settable with the RFID interrogator to an automatic data logger or RFID wireless sensor. The tag is adjustable to various types of digital sensors from various manufacturers. A hardwired dedicated processing unit makes it possible that the tag saves more energy, has smaller dimensions and is faster.

19 Claims, 4 Drawing Sheets

Figure 1:
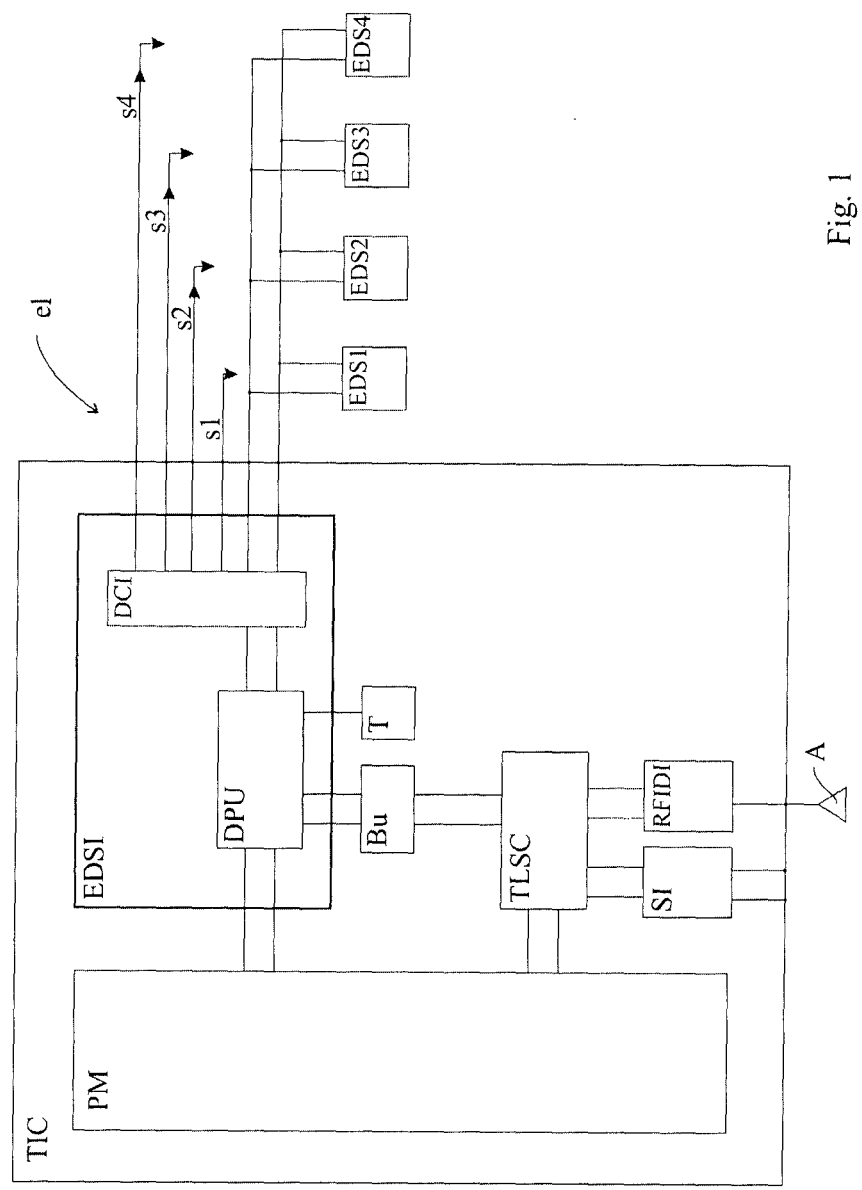

(51) Int. Cl.
*G06K 19/077* (2006.01)
*G06F 9/30* (2006.01)
*G06K 7/00* (2006.01)

(52) U.S. Cl.
CPC ........ *G06F 9/3001* (2013.01); *G06F 9/30036* (2013.01); *G06F 9/30145* (2013.01); *G06K 7/0008* (2013.01)

(56) References Cited

U.S. PATENT DOCUMENTS

| | | | | |
|---|---|---|---|---|
| 8,436,714 | B2* | 5/2013 | Rodriguez | H04Q 9/00 340/10.1 |
| 8,791,796 | B2* | 7/2014 | Shiotsu | G06K 7/0008 340/10.1 |
| 8,988,223 | B2* | 3/2015 | Puleston | H04L 67/04 340/10.1 |
| 9,041,513 | B1* | 5/2015 | Pai | G06F 11/0736 340/10.1 |
| 2010/0238002 | A1 | 9/2010 | Ryan et al. | |
| 2011/0301903 | A1* | 12/2011 | Humbert | G01D 18/008 702/104 |

* cited by examiner

METHOD FOR AN ACQUISITION OF DATA FROM EXTERNAL DIGITAL SENSORS WITH AN RFID SMART TAG AND A TAG INTEGRATED CIRCUIT FOR CARRYING OUT SAID METHOD

The invention relates to a method for an acquisition of data from external digital sensors with an RFID smart tag and an integrated circuit of the RFID smart tag for carrying out said method. The purpose of the invention is to propose said tag integrated circuit for the acquisition of data from the external digital sensors, which integrated circuit made of a hard-wired dedicated processing unit will only be able to execute a very limited set of microinstructions but will be settable to various functionalities and adjustable to various sensors as well as having low energy consumption, smaller dimensions and will operate faster than the tag integrated circuits known so far.

An RFID smart tag is usually self-sufficient. It does not need any additional external elements for its operation. This is advantageous as far price is regarded, yet it is deficient in terms of a possibility to expand and upgrade the infrastructure of the tag. Usually, no external element or new function can be added to the integrated circuit of the RFID smart tag.

Nevertheless, many sensors of different types can be simultaneously attached to an RFID smart tag through an interface. The RFID smart tag then excites external sensors, acquires and processes data obtained by said sensors, e.g. on temperature, humidity, pressure, illumination and other physical quantities.

An RFID smart tag with sensors is used as a data logger or a wireless sensor.

The RFID smart tag used as a data logger has an own energy source. The sensor automatically measures and stores data into a permanent memory, e.g. ellectrically erasable programmable read-only memory—EEPROM.

The RFID wireless sensor has no own energy source because it does not need to automatically carry out a measurement and logging data.

There is known an RFID smart tag provided with an interface for an acquisition of data from external analogue sensors (PCT/SI2010/000056). It is advantageous that the analogue sensors have an analogue electric parameter, e.g. resistance, capacitance, voltage or current, as an output quantity, as this makes it applicable for the measurement of various physical quantities, such as temperature, humidity, acceleration, luminous flux and others. Each analogue sensor as well as reference sources comprised in a tag chip have a certain tolerance; consequently, each such system must be calibrated under exactly determined circumstances, which contribute to a higher price of the tag chip.

Digital sensors get equipped with an analogue-to-digital converter during the production and get calibrated at the same time. Reference sources in the tag chip have no influence on the measurement accuracy. Hence, the accuracy of the RFID measurement system is determined by the accuracy of the applied digital sensor and no calibration of said system is needed anymore.

There is known an RFID smart tag provided with an interface intended for the attachment of external analogue sensors and with a digital communication interface of the type I²C for the attachment of external digital sensors (PCT/IT2007/000833). A tag circuitry comprises a microprocessor connected to a unique program memory. Said memory comprises a program for operating the entire integrated circuit and is separated from a data memory. A program part intended for digital communication with the external digital sensors cannot subsequently be changed during an application with an RFID interrogator later. It must be downloaded before using the RFID tag in a specific application. Patent application PCT/IT2007/000833 neither discloses the operation of a digital communication interface nor proposes how to do away with a problem in the fourth step of the method for communication with the external digital sensors. The steps of said communication method are: 1) sending an address of a chosen sensor, 2) sending settings of said sensor, 3) sending a command for carrying out an analogue-to-digital conversion, 4) waiting for accomplishing said conversion and 5) reading sensor data in a digital form. Duration of the analogue-to-digital conversion depends on the type of the sensor, the rate of its analogue-to-digital conversion and resolution, but it often exceeds the time of 20 milliseconds as determined by the standard, e.g. ISO 15693, EPC Gen 2, ISO 18000-6/c. The RFID smart tag must respond to the RFID interrogator within said time.

The embodiment of an integrated circuit of an RFID smart tag provided with a microprocessor unit makes it possible to change functionality of the tag by means of a software stored in a permanent memory, however, it is actually problematic due to high energy consumption of the tag, considerable dimensions and a rather slow operation of the microprocessor unit. All said deficiencies should be done away in that the integrated circuit of the RFID smart tag is embodied by means of a hard-wired logic sequential circuit as a dedicated processing unit but in a way that the functionality of the RFID smart tag in connection with the RFID interrogator would remain adaptable to a certain extent.

The invention solves the technical problem by foreseeing such an interface for attaching external digital sensors to an integrated circuit of the RFID smart tag that, in an application, a tag functionality will be settable with an RFID interrogator either to a data logging or to a distance measurement and adjustable to various types of the external digital sensors from various manufacturers, whereat said interface for attaching the external digital sensors should be made with a hard-wired dedicated processing unit driving a digital communication interface, and also by foreseeing a method for an acquisition of data from the external digital sensors with the RFID smart tag provided with said integrated circuit.

Said technical problem is solved by the method of the invention for the acquisition of data from the external digital sensors with the RFID smart tag as characterized by the features of the first claim and by the tag integrated circuit for carrying out said method as characterized by the features of the thirteenth claim. Dependent claims, however, characterize the variants of their embodiments.

The RFID smart tag embodied with the integrated circuit of the invention stands out due to its functionality in an application being settable with the RFID interrogator according to the method of the invention in a way that it can operate as an automatic data logger or an RFID wireless sensor.

The RFID smart tag of the invention is adjustable to various types of external digital sensors from various manufacturers so that the external digital sensors can be processed with an analogue-to-digital conversion of various speeds.

The integrated circuit of the invention with the hard-wired dedicated processing unit makes it possible that the RFID smart tag saves more energy, has smaller dimensions and is faster.

Figure 1A:
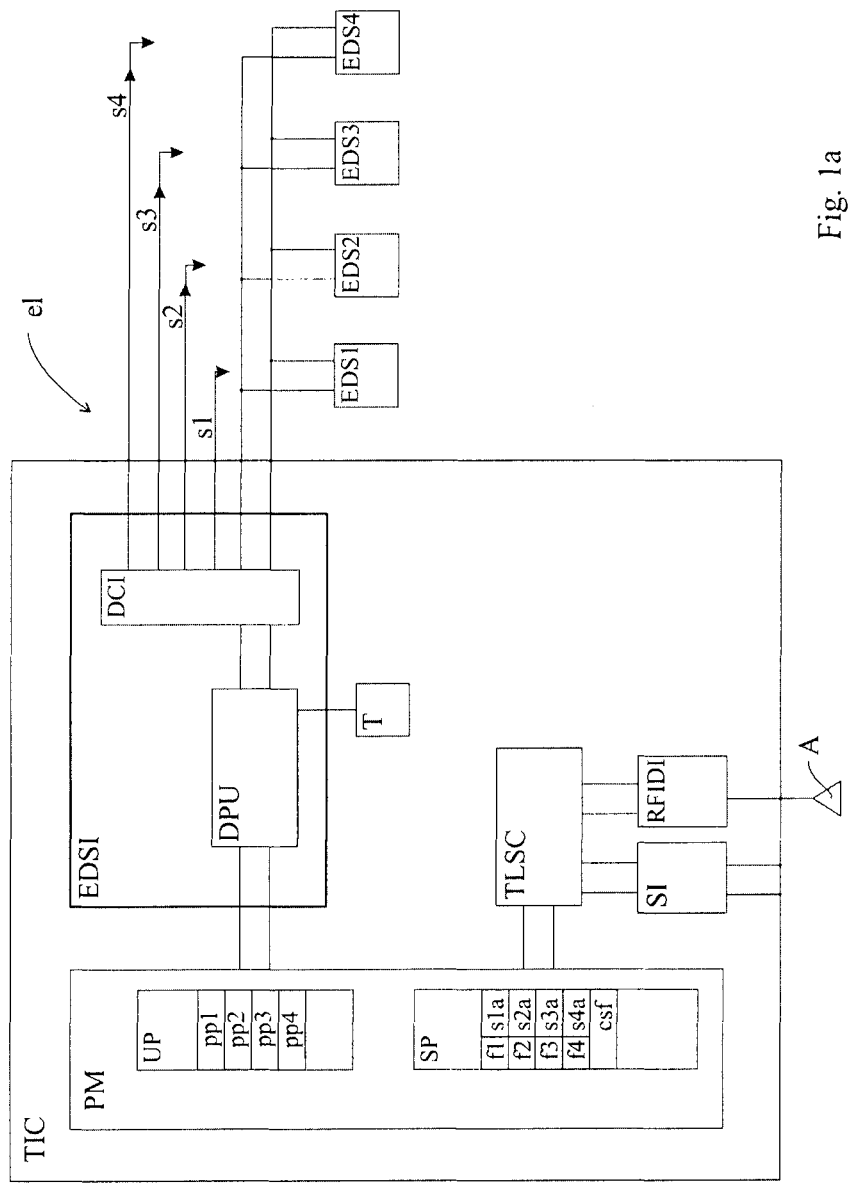
Figure 1B:
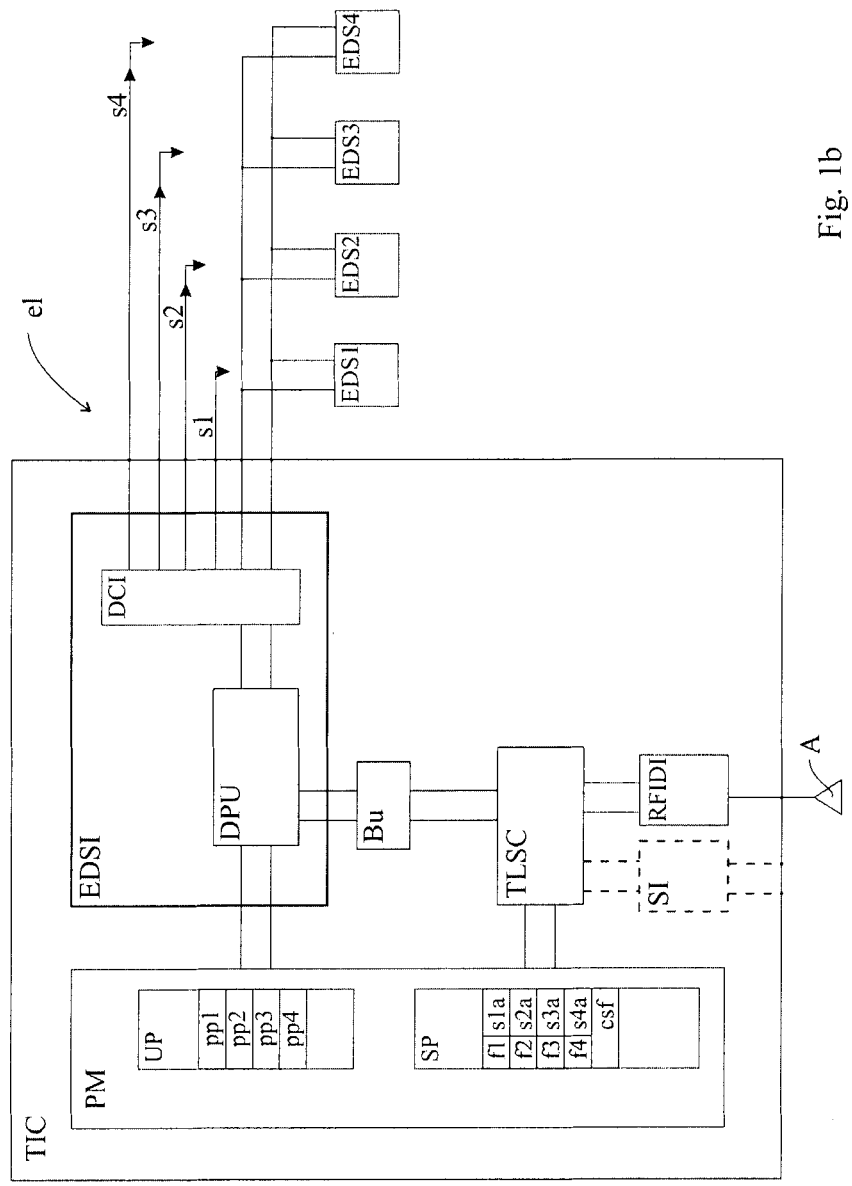
Figure 1C:
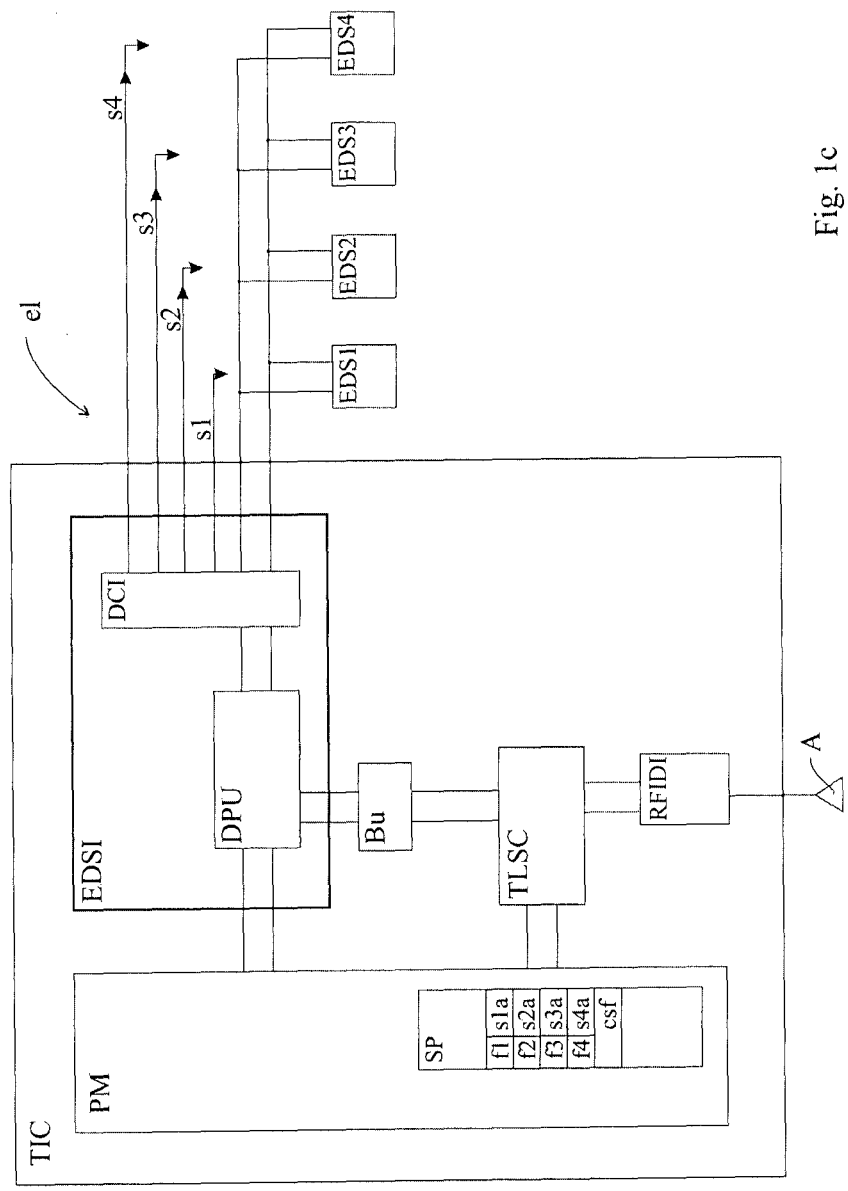

The invention will now be explained in more detail by way of the description of embodiments of a method of the invention for an acquisition of data from external digital sensors with an RFID smart tag and of a tag integrated circuit of the invention for carrying out said method and with reference to the accompanying drawing representing in FIG. 1 an integrated circuit of the invention of an RFID smart tag for an acquisition of data from external digital sensors, FIG. 1a a connection diagram of elements of said tag integrated circuit of the invention, with which elements the RFID smart tag performs a function of an automatic data logger in that the RFID interrogator or a microcontroller previously loads a microprogram into a permanent memory, an execution of which microprogram is triggered by a timer, FIG. 1b a connection diagram of elements of said tag integrated circuit of the invention, with which elements the RFID smart tag performs a function of a wireless sensor in that the RFID interrogator previously loads a microprogram into a permanent memory, an execution of which microprogram is triggered by an interrogator RFID command, FIG. 1c a connection diagram of elements of said tag integrated circuit of the invention, with which elements the RFID smart tag performs a function of a wireless sensor in that the RFID interrogator previously loads a microprogram, an execution of which microprogram is automatically triggered immediately afterwards.

An RFID smart tag provided with an integrated circuit TIC of the invention (FIG. 1) acquires data from external digital sensors EDS1, . . . , EDSK. The number K of said external digital sensors is a natural number—four attached external digital sensors are shown in Figures—and is not limited.

According to the invention functionality of the integrated circuit TIC is settable by means of an RFID interrogator in that the RFID smart tag operates as an automatic data logger or as a wireless sensor. The RFID smart tag can operate as a wireless sensor in one of the following two disclosed ways.

Consequently, three pertinent embodiments of the method for an acquisition of data from the external digital sensors EDS1, . . . , EDSK with the RFID smart tag will be disclosed below.

The following start steps of the proposed method are known and are the same for all three embodiments.

Addresses s1a, . . . , sKa of the external digital sensors EDS1, . . . , EDSK, enabling flags f1, . . . , fK' for individual program pages of a microprogram that is required and sufficient to perform communication between the RFID smart tag and said sensors, and a frequency csf of a clock signal intended for communication of a digital communication interface DCI of the tag with said sensors are stored in a system part SP of a tag permanent memory PM of the tag. K' means a number of program pages of said microprogram. One program page is normally foreseen for each attached external digital sensor; in this case K'=K. Program pages can be joined to longer pages, if less external digital sensors are attached as it has been foreseen.

All three said embodiments of the method of the invention also have first and second characterizing steps in common.

First said microprogram is loaded in a tag memory PM; Bu accessible by a user by means of an RFID interrogator through an RFID interface RFIDI of the tag or, especially in the first embodiment of the method of the invention, also by means of a microcontroller through a serial interface SI of the tag.

Then a hard-wired dedicated processing unit DPU foreseen for executing microinstructions reads, decodes and executes said microprogram through the digital communication interface DCI.

The first embodiment of the method of the invention, according to which the RFID smart tag operates as an automatic data logger, also comprises the following characterizing steps.

Said microprogram is loaded in a user part UP of the tag permanent memory PM by means of the RFID interrogator through the RFID interface RFIDI or by means of the microcontroller through the serial interface SI. Said microprogram comprises microinstructions to initialize the external digital sensors and microinstructions to read data therefrom.

A tag timer T triggers said dedicated processing unit DPU to execute said micro-program.

Data acquired from the external digital sensors EDS1, . . . , EDSK are stored in a permanent memory part provided for sensor data, wherefrom the RFID interrogator can read said data.

The second embodiment of the method of the invention, according to which the RFID smart tag operates as a wireless sensor, comprises the following characterizing steps besides the mentioned first and second steps.

In this embodiment, said microprogram is loaded in the user part UP of the tag permanent memory PM as well, but preferably by means of the RFID interrogator through the RFID interface RFIDI.

With an RFID command, the RFID interrogator triggers said dedicated processing unit DPU to execute said microprogram. When doing it, the RFID interrogator with an RFID command can determine a program page of said microprogram which should be executed by said dedicated processing unit DPU.

Data acquired from the external digital sensors EDS1, . . . , EDSK is stored in beginning locations of said buffer Bu. The buffer Bu is of such type (FIFO buffer) that the first stored data are retrieved therefrom first.

With the RFID command access FIFO, the RFID interrogator reads said data from the buffer Bu.

The third embodiment of the method of the invention, according to which the RFID smart tag operates as a wireless sensor in the second one of the two ways, comprises the following characterizing steps besides the already mentioned first and second steps.

The RFID interrogator downloads said microprogram in the buffer Bu of such type (FIFO buffer) that first stored data is retrieved therefrom first. The buffer Bu should comprise one program page with sixteen 8-bit bytes.

The dedicated processing unit DPU starts executing said microprogram immediately after having been signaled by the buffer Bu that it has finished downloading said microprogram.

The data acquired from the external digital sensors EDS1, . . . , EDSK is stored in the beginning locations of said buffer Bu in order to prevent the part of the microprogram not yet executed from failing.

With an RFID command, the RFID interrogator reads said data from the buffer Bu.

Said microprograms for all three embodiments of the method of the invention for the acquisition of data from the external digital sensors by means of the RFID smart tag use microinstructions having the same format and the same code. The RFID interrogator commands are decoded in the digital part of the tag's logic sequential circuit TLSC.

A proposed integrated circuit TIC (FIG. 1) in an RFID smart tag for an acquisition of data from external digital sensors EDS1, . . . , EDSK wherein K means an arbitrary number of said external digital sensors in a known way comprises: a digital communication interface DCI of the I²C type provided to attach said external digital sensors, to which enabling lines el conduct signals s1, . . . , sK, an RFID interface RFIDI connected to an antenna A and a serial interface SI, a permanent memory PM, a tag's logic sequential circuit TLSC, which is connected to the RFID interface RFIDI and the serial interface SI on the one hand and to a permanent memory PM on the other hand, and a timer T.

The integrated circuit TIC as proposed by the invention is characterized by the following relations.

Predominantly, said integrated circuit TIC includes the hard-wired logic sequential circuit as a dedicated processing unit DPU.

The dedicated processing unit DPU is only dedicated to carry out a microprogram that is required and sufficient for performing communication between the RFID smart tag and the external digital sensors EDS1, ..., EDSK. It is only able to process a limited set of microinstructions, which are either stored in a user part UP of the permanent memory PM or continuously downloaded in a buffer Bu.

It proves suitable for the dedicated processing unit DPU to be able to decode and execute twelve predetermined 8-bit microinstructions. These microinstructions are represented in a table at the end of the description of the subject of the invention. Some microinstructions consist only of an instruction code, whereas others consist of an instruction code followed by 8-bit data. For example, one of the microinstructions makes it possible to read data from the external digital sensors and write said data into the permanent memory PM.

Said dedicated processing unit DPU is connected to the digital communication interface DCI. They together build up an external digital sensor interface EDSI.

Said dedicated processing unit DPU is connected to the logic sequential circuit TLSC of the tag through the permanent memory PM on the one hand and through the buffer Bu on the other hand said buffer being of such type (FIFO buffer) that the first stored data is first retrieved therefrom.

Said dedicated processing unit DPU is connected to the timer T as well.

On the one hand, a system part SP is advantageously formed in the permanent memory PM, wherein also the parameters needed for the operation of the external digital sensor interface EDSI are stored: 7-bit addresses s1$a$, ..., sK$a$ of the external digital sensors EDS1, EDSK for communicating according to I$^2$C standard, enabling flags f1, ..., fK' for corresponding program pages of said microprogram as well as a frequency csf of a clock signal intended for said communicating of the digital communication interface DCI of the tag with said external digital sensors—of 100 kHz, 400 kHz or 1 MHz at communicating according to I$^2$C standard.

On the other hand, a user part UP is advantageously formed in the permanent memory PM too. The user part UP is accessible by the user through the RFID interrogator. The user part UP usually stores so many program pages pp1, ..., ppK with sixteen 8-bit bytes as there are external digital sensors EDS1, ..., EDSK attached. These program pages may be enabled individually or jointly to longer ones if less external digital sensors are attached as foreseen when designing the RFID tag.

Separate storing of sensor addresses s1$a$, ..., sK$a$ and program pages pp1, ..., ppK saves space in the user part UP of the permanent memory PM and at the same time makes it possible that the RFID interrogator having the access to the user part UP of the permanent memory PM can dowload the microprogram.

The microprogram having one program page with sixteen 8-bit bytes per each attached external digital sensor is foreseen for carrying out the method of the invention.

Said buffer Bu comprises one program page with sixteen 8-bit bytes.

The operation of the integrated circuit TIC (FIG. 1) as proposed by the invention will be described in the continuation.

In the first embodiment of the method of the invention, the functionality of the integrated circuit TIC of the invention is set by means of the RFID interrogator in a way that the RFID smart tag operates as an automatic data logger. Elements of the tag integrated circuit TIC, by means of which elements the RFID smart tag performs data logger function, are represented in FIG. 1$a$.

In uniform time intervals, the timer T requires the communication with a chosen external digital sensor to start. In the system part SP of the permanent memory PM, the dedicated processing unit DPU checks, which program pages it has to execute, and uses the corresponding addresses of the external digital sensors. The dedicated processing unit DPU reads and executes the microprogram from the permanent memory PM following individual microinstructions. The digital communication interface DCI enables the chosen external digital sensor and writes the settings therein. The digital communication interface DCI demands the analogue-to-digital conversion of data obtained by the sensor, reads the conversion result after a time-lapse determined by the microprogram, and writes it into the permanent memory PM.

In the second embodiment of the method of the invention, the functionality of the integrated circuit TIC of the invention is set by means of the RFID interrogator in a way that the RFID smart tag operates as a wireless sensor in the first way. Elements of the tag integrated circuit TIC, by means of which the RFID smart tag performs the wireless sensor function, are represented in FIG. 1$b$.

With a dedicated command, the RFID interrogator requires executing the micro-program loaded in the user part UP of the tag permanent memory PM and also provides information, which program pages have to be executed. The dedicated processing unit DPU reads the corresponding addresses of the external digital sensors in the system part SP of the permanent memory PM, reads and, following individual microinstructions, executes the microprogram from the permanent memory PM. The digital communication interface DCI enables the chosen external digital sensor, writes settings in it, requires the analogue-to-digital conversion of data obtained by the sensor and after a time-lapse determined by the microprogram reads the conversion result and writes it into the buffer Bu. The RFID interrogator reads data from the buffer Bu.

In the third embodiment of the method of the invention, the functionality of the integrated circuit TIC of the invention is set by means of the RFID interrogator in a way that the RFID smart tag operates as a wireless sensor in the second way. Elements of the tag integrated circuit TIC, by means of which the RFID smart tag performs the wireless sensor function, are represented in FIG. 1$c$.

With a dedicated command, the RFID interrogator writes the microprogram into the buffer Bu of said type and indicates the information on the address of the external digital sensor, which has to be used. The dedicated processing unit DPU reads the corresponding addresses of the external digital sensors in the system part SP of the permanent memory PM, reads and, following individual microinstructions, executes the microprogram from the buffer Bu. At that time the flag FIFO busy signals that the buffer Bu is in use. The digital communication interface DCI enables the chosen external digital sensor, writes settings in it, demands the analogue-to-digital conversion of data obtained by the sensor and after a time-lapse determined by the microprogram reads the conversion result and writes it into the buffer Bu. The RFID interrogator reads data from the buffer Bu. This embodiment of the method of the invention makes processing the external digital sensors with differently long analogue-to-digital conversion times possible.

A set of twelve microinstructions represented in the following Table and possibly classified into five groups is suggested to be used in the RFID smart tag of the invention.

Control of enabling and supply signals (microinstruction No. 1):

It includes a control of output signals s1, ..., sK from the integrated circuit, which signals are used as signals enabling the external digital sensors, as said sensors need no supply until the analogue-to-digital conversion is required.

A time delay (microinstructions Nos. 2, 3 and 4):

The user determines an execution time delay, e.g. after switching on a supply or sending the conversion demand.

Basic I²C symbols (microinstructions Nos. 5 and 6):

A start symbol and a stop symbol that are parts of I²C protocol.

Basic I²C commands (microinstructions Nos. 7 and 8):

Basic commands, such as commands for reading and writing data consisting of a start symbol, an R bit or a W bit, a 7-bit sensor address and data on writing or needed clock signals for reading data.

Complex I²C commands (microinstructions Nos. 9, 10, 11 and 12): They are provided to change the settings of the external sensors and designed in a way to be able to read data from the sensor, reset only certain bits in said data and write a result back to the sensor.

TABLE

| Code No | \multicolumn{8}{c}{Microinstruction Code Bit No} | Microinstruction Function |

| Code No | 7 | 6 | 5 | 4 | 3 | 2 | 1 | 0 | Microinstruction Function |
|---|---|---|---|---|---|---|---|---|---|
| 1 | 0 | 0 | 0 | 0 | S3 | S2 | S1 | S0 | Enable signals for external sensor supply lines.; 0 - supply line is turned off, 1 - supply line is turned on |
| 2 | 0 | 1 | T[5] | T[4] | T[3] | T[2] | T[1] | T[0] | Delay time in T * 10 μs (000101 = 50 μs) |
| 3 | 1 | 0 | T[5] | T[4] | T[3] | T[2] | T[1] | T[0] | Delay time in T * 1 ms (000101 = 5 ms) |
| 4 | 1 | 1 | 0 | 0 | 0 | 0 | 0 | 0 | NOP (no operation) |
| 5 | 1 | 1 | 0 | 0 | 0 | 0 | 0 | 1 | I2C stop condition |
| 6 | 1 | 1 | 0 | 0 | 0 | 0 | 1 | 1 | I2C start condition |
| 7 | 1 | 1 | 0 | 1 | N[3] | N[2] | N[1] | N[0] | I2C write command; generates Start condition → I2C sensor address + W bit → N number of bytes. The N value defines how many bytes follow the I2C write command and are regarded as pure data. |
| 8 | 1 | 1 | 1 | 0 | N[3] | N[2] | N[1] | N[0] | I2C read command; generates Start condition → I2C sensor address + R bit → N number of bytes. The N value defines how many bytes will be read out of the I2C slave device. The received bytes are either logged to the internal EEPROM, or stored in an intermediate register to be read out by the RFID reader. |
| 9 | 1 | 1 | 1 | 1 | 0 | 0 | 0 | 0 | I2C complex command; reads data from a register, changes masked bits, and temporarily stores the modified bytes. Command structure: I2C start → I2C slave address + R bit → read data bytes → (internal operation mask and modify). |
| 10 | 1 | 1 | 1 | 1 | 0 | 0 | 0 | 1 | I2C complex command - writes data from temporary register. Command structure: I2C start → I2C slave address + W bit → pointer byte (next instruction in program memory) → write data byte. |
| 11 | 1 | 1 | 1 | 1 | 0 | 0 | 1 | 0 | I2C complex command 16-bit - reads data from a register, changes masked bits, and temporarily stores the modified byte. Command structure: I2C start → I2C sensor address + R bit → read data bytes → (internal operation mask and modify). |
| 12 | 1 | 1 | 1 | 1 | 0 | 0 | 1 | 1 | I2C complex command 16-bit - writes data from temporary register. Command structure: I2C start → I2C sensor address + W bit → pointer byte (next instruction in program memory) → write data byte. |

The invention claimed is:

1. A method for an acquisition of data from a natural number of external digital sensors with a Radio-Frequency Identification (RFID) smart tag, the method comprising:

storing, in a permanent memory of the RFID smart tag,
addresses of the external digital sensors,
enabling flags for pages of a microprogram, which is required and sufficient for executing communication between the RFID smart tag and the sensors, and
a frequency of a clock signal intended for communicating of a digital communication interface with the sensors,
wherein the microprogram is stored in a tag memory being accessible by an RFID interrogator, the tag memory comprising at least one of the permanent memory or a buffer, and
wherein a hard-wired dedicated processing unit of the RFID smart tag reads, decodes and executes the microprogram through the digital communication interface.

2. The method as recited in claim 1, wherein the RFID interrogator stores the microprogram in a user part of the permanent memory through an RFID interface.

3. The method as recited in claim 1, wherein microcontroller stores the microprogram in a user part of the permanent memory through a serial interface.

4. The method as recited in claim 2 or 3, wherein a timer triggers the dedicated processing unit to start executing the microprogram.

5. The method as recited in claim 4, wherein data acquired from the external digital sensors is stored in the permanent memory in a way that is accessible by the RFID interrogator.

6. The method as recited in claim 2 or 3, wherein the RFID interrogator triggers the dedicated processing unit with an RFID command to start executing the microprogram.

7. The method as recited in claim 6, wherein the RFID interrogator determines with an RFID command a program page of the microprogram to be executed by the dedicated processing unit.

8. The method as recited in claim 1, wherein the RFID interrogator stores the microprogram in the buffer such that the first stored data is retrieved therefrom first.

9. The method as recited in claim 8, wherein the dedicated processing unit starts executing the microprogram after the buffer signals to the dedicated processing unit that downloading of the microprogram has been accomplished.

10. The method as recited in claim 6, wherein data acquired from the external digital sensors is stored at beginning locations of the buffer.

11. The method as recited in claim 10, wherein the RFID interrogator reads the data from the buffer with an RFID command.

12. The method according to claim 1, wherein the microprogram uses microinstructions having the same format and the same code.

13. An integrated circuit of a Radio-Frequency Identification (RFID) smart tag for an acquisition of data from a natural number of external digital sensors, the integrated circuit comprising:
- a digital communication interface, to which a natural number of external digital sensors are attached;
- an RFID interface;
- a serial interface;
- a permanent memory;
- a logic sequential circuit, which is connected to the RFID interface and the serial interface on one hand and to the permanent memory on the other hand; and
- a timer,
- wherein the integrated circuit comprises the logic sequential circuit as a hard-wired dedicated processing unit, which is only able to carry out a microprogram, the microprogram being required and sufficient to perform communication between the RFID smart tag and the sensors,
- wherein the dedicated processing unit is connected to the digital communication interface,
- wherein the dedicated processing unit is connected to the logic sequential circuit through the permanent memory on one hand and through a buffer of such type that the first stored data is retrieved therefrom first on the other hand, and
- wherein the dedicated processing unit is connected to the timer.

14. The integrated circuit as recited in claim 13, wherein the dedicated processing unit is only able to decode and execute twelve 8-bit microinstructions.

15. The integrated circuit as recited in claim 14, wherein a system part stores
- addresses of the external digital sensors,
- enabling flags for pages of the microprogram, and
- a frequency of a clock signal intended for communicating of the digital communication interface with the sensors and
- wherein the system part is formed in the permanent memory.

16. The integrated circuit as recited in claim 15, wherein a user part being accessible by an RFID interrogator and comprising one program page with sixteen 8-bit bytes per each attached external digital sensor is formed in the permanent memory.

17. The integrated circuit as recited in claim 16, wherein the microprogram occupies one program page with sixteen 8-bit bytes for each attached external digital sensor.

18. The integrated circuit as recited in claim 17, wherein individual program pages can be joined to longer program pages, if their number exceeds a number of attached sensors.

19. The integrated circuit as recited in claim 18, wherein the buffer comprises one program page with sixteen 8-bit bytes.

* * * * *